United States Patent [19]
Baitz et al.

[11] Patent Number: 5,785,533
[45] Date of Patent: Jul. 28, 1998

[54] TERMINATION PANEL FOR CONTROL UNIT

[75] Inventors: Günter Baitz; Hartmut Kamin, both of Berlin, Germany

[73] Assignee: Siemens Nixdorf Informationssysteme Aktiengesellschaft, Paderborn, Germany

[21] Appl. No.: 646,346
[22] PCT Filed: Nov. 4, 1994
[86] PCT No.: PCT/DE94/01304
§ 371 Date: May 15, 1996
§ 102(e) Date: May 15, 1996
[87] PCT Pub. No.: WO95/14367
PCT Pub. Date: May 26, 1995

[30] Foreign Application Priority Data

Nov. 15, 1993 [DE] Germany ............... 43 38 987.2

[51] Int. Cl.⁶ .................................................. H05K 1/14
[52] U.S. Cl. ....................................... 439/61; 361/686
[58] Field of Search ............... 439/61; 361/683–686, 361/784, 785, 790

[56] References Cited

U.S. PATENT DOCUMENTS

| 4,496,943 | 1/1985 | Greenblatt | 361/685 |
| 5,030,128 | 7/1991 | Herron | 439/639 |
| 5,038,308 | 8/1991 | Le et al. | 361/685 |
| 5,121,295 | 6/1992 | Lam | 361/684 |
| 5,214,567 | 5/1993 | Feightner et al. | 361/685 |
| 5,305,182 | 4/1994 | Chen | 361/684 |
| 5,322,447 | 6/1994 | Okada | 439/541.5 |

FOREIGN PATENT DOCUMENTS

| 91 01 940 | 6/1991 | Germany . |
| 93 16 277 | 2/1994 | Germany . |

OTHER PUBLICATIONS

*IBM Technical Disclosure Bulletin*, vol. 34, No. 2, Jul. 1991, pp. 198–199.
Service Manual for Siemens Nixdorf Informationssysteme "Kassensysteme Beetle x/50 und x/60", Sep. 1993, pp. 4–1 and 4–2.

Primary Examiner—Neil Abrams
Attorney, Agent, or Firm—Hill & Simpson

[57] ABSTRACT

The invention relates to a PC-based electronic control unit 10 with a mother board 20 and an additional printed circuit board 38, whose connection plugs are accessible through apertures, arranged in parallel rows, in a housing wall 18. Between these rows there is a further row of apertures for 134,150,154 connection plugs 34,50,54 which may be provided on the mother board 20 or on the additional printed circuit board 38 or else on daughter boards 28 which can be plugged onto one of the mother board 20 or the additional printed circuit board 38. A connector 56 for receiving a memory card 60 is provided on the mother board 20. A plug 62 is engageable with the memory card and the plug cable 64 is passed through an opening 66 in the housing wall 18.

10 Claims, 1 Drawing Sheet

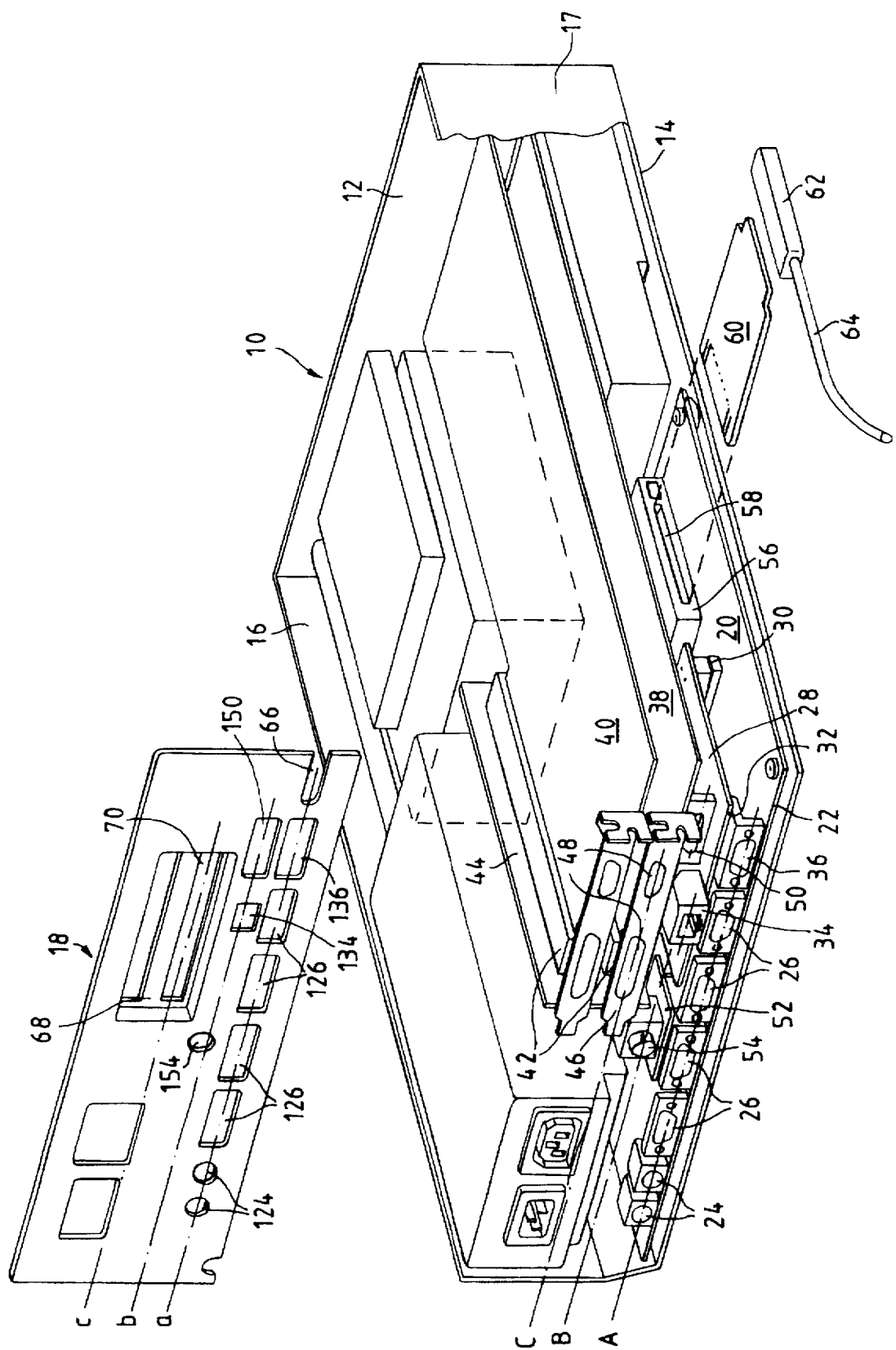

TERMINATION PANEL FOR CONTROL UNIT

BACKGROUND OF THE INVENTION

The present invention generally relates to an electronic control unit containing multiple printed circuit boards. More particularly, the present invention relates to an electronic control unit arrangement having multiple circuit boards and accessible connection plugs arranged in a rear face of the housing.

A known control unit of the aforesaid type is known as a so-called electronic box of the beetle cash register system from Siemens Nixdorf Informationssysteme [information systems] AG, Paderborn. (Siemens Nixdorf Informationssysteme AG: Service Manual "Kassensysteme BEETLE [BEETLE cash register systems] x/50 and x/60" dated September 1993, pp 4-1 and 4-2). The control unit is largely composed of PC components.

DE-U-91 01 940.0 discloses a mounting device which serves to arrange an additional printed circuit board with a frontplate according to the PC standard—referred to as a computer interface card in that application—in a notebook computer. A through-opening is provided in one side wall of the computer housing, through which connection plugs arranged on the frontplate of the additional printed circuit board are accessible. The through-opening is arranged parallel to a row of plugs which are assigned to a central processing unit.

Particularly in cash register systems' a larger number of peripheral units are frequently connected than in applications of personal computers in offices. In such cash register systems, the problem of insufficient space available on the backplane for connection plugs and externally accessible control elements repeatedly arises. This problem is exacerbated by the fact that, despite the integration of more and more functions into the electronic box, the physical size of the box is becoming smaller and smaller as development progresses.

The invention is therefore based on the object to provide additional plug and connection space without giving up the functional relationship, customary in PCs, between the printed circuit boards and the design of their termination panels.

SUMMARY OF THE INVENTION

The invention achieves the object by providing an electronic control unit with a motherboard and an additional circuit board, each having connectors accessible through apertures disposed in parallel rows in a rear housing wall. Between these rows is located an additional row of apertures for connectors which are associated with the motherboard, the additional circuit board or an auxiliary board which is mounted on either motherboard or the additional circuit board.

The invention is baased on the observation that, in PC-based electronic control units, all the electronic components required for the basic functions are arranged on a so-called mother board. These components are essentially the CPU, the working memory, the keyboard controller and various interface controllers. Modules which are used in different embodiments but count as part of the basic equipment, for example the screen controller, are plugged onto the mother board as daughter boards—so-called piggyback boards. The connection of the daughter board to the exterior is made via a plug which is provided on the baseplate. Optional equipment levels are realized by adding additional printed circuit boards, preferably so-called AT boards. These can themselves receive daughter boards, for example network controllers, whose connection to the exterior is made via a plug in the frontplate of the additional printed circuit board. The connection plugs are therefore strictly assigned in rows to the individual printed circuit board levels, and the assignment is thus limited in terms of number and size by the space available for the respective level. Each of these levels is assigned rows of apertures in the backplane of the housing.

The aforementioned limitation can be overcome if a further row of apertures for possible plugs and/or cables is provided between the row which is determined by the mother board and the row which is defined by the frontplate of an additional printed circuit board adjacent to said mother board. This further row can then be reached by plugs of the mother board, of the additional printed circuit boards and of the daughter boards of the two first mentioned printed circuit boards. Connections of these daughter boards can then be led directly outwards and no longer have to be led via plugs on the printed circuit board supporting them. As a result, the space which is otherwise required for these connection plugs becomes free and can be used in other ways. Moreover, a piggy-back plug, and the space for it and its connection conductor tracks, become free.

The additional row of apertures can also, be reached by plugs on the mother board and on the additional printed circuit board. This is assisted in particular by printed circuit boards which are equipped in accordance with SMD technology. This technology specifically permits the building up of components, that is to say even of plugs on both sides of the printed circuit board. At the same time, plugs on one side can be assigned to one row and plugs on the other side can be assigned to an adjacent row. The same applies to the daughter boards.

Instead of, or in addition to, daughter boards, card slots, for example according to the PCMCIA standard, can also be used, the receiving aperture of which is located in the additional row of apertures. These card slots serve to receive additional memory boards or even board-shaped interface controllers or modems.

If the receiving aperture is to be accessible from the outside, it is located directly at a housing aperture. If it is not to be accessible during operation or if it is to be accessible only after the housing of the unit is opened, the card slot is set back into the interior of the housing. A connection cable which may be necessary is then led through a cable opening in the backplane.

Additional features and advantages of the present invention are described in, and will be apparent from, the detailed description of the preferred embodiments and from the drawing.

BRIEF DESCRIPTION OF THE DRAWING

The Figure is an exploded, schematic, perspective view from the rear of an open electronic control unit according to the present invention.

DETAILED DESCRIPTION OF THE PREFERRED EMBODIMENTS

An electronic control unit is generally designated by 10. Only parts of its housing are illustrated, specifically a front panel 12, a bottom panal 14, a side wall 16 and a backplane or a rear wall 18, which is shown displaced upwards in order to illustrate the interior of the unit more clearly. The second side wall 17 is shown with portions removed. The cover of the unit is not illustrated.

A mother board 20 which extends essentially over the entire width of the housing is arranged in the rear region of the unit, parallel to the baseplate 14. The rear edge 22 of the mother board 20 is equipped with various plugs 24 for connecting keyboards plugs and 26 for peripheral units with a serial interface. These plugs are located in a first level A.

An auxiliary board or; daughter board 28 is plugged onto the mother board 20 in a piggy-back manner. The printed circuit boards 20 and 28 are connected to one another electrically and mechanically by means of a pair 30 of plug/socket connectors. On its side 32 facing the backplane, the daughter board 28 has a telephone connection socket 34. The latter is located in a second level B. A further connection plug 36 for the connection of a VDU is arranged on the underside of the daughter board 28, and is thus located in the first level A.

Two additional printed circuit boards 38, 40 are arranged parallel to the mother board 20. The additional printed circuit boards 38, 40 are plugged onto an AT bus backplane 44 using peripheral edge plugs 42. The said AT bus backplane 44 is plugged onto the mother board 20 in a way which is known and is therefore not illustrated in greater detail. The additional printed circuit boards 38, 40 are of essentially identical design according to the PC-AT standard. Therefore, greater details are only given on the first additional printed circuit board 38.

The additional PCB 38 has a frontplate 46 according to the PC standard. The frontplate is fitted with connection plugs 48 whose contacts are electrically connected to the additional printed circuit board 38.

The frontplate 46 is located in a third level C. Arranged on a side of the additional printed circuit board 38 which faces away from the frontplate 46 is a further plug 50, which is located in the second level B.

In the exemplary embodiment on the left next to the daughter board 28 in the second level B there is a further printed circuit board 52 with a voltage supply plug 54 for peripheral units. Likewise in the second level B, a card slot 56 according to the PCMCIA standard is, furthermore, arranged behind the daughter board 28, the receiving aperture 58 of which card slot 56 is oriented towards one side of the control unit 10. A plugin card 60, for example a modem card, can be plugged into the said receiving aperture 58. The plug 62 of a cable 64 can, in turn, be plugged onto the said modem card. As is clear from the drawing, the card slot 56 is offset away from the side of the unit towards the interior of the unit, so that a free space for the cable 64 is produced, through which free space the said cable 64 can be led to the backplane 18. There, it passes to the outside through a cable opening 66.

The backplane or rear wall 18 is provided with apertures 124, 126, 136 for the plugs 24, 26, 36, and with the cable opening 66. These apertures are located in a first row a. Arranged parallel to the latter is a second row b with apertures 134, 150, 154 for the plugs 34, 50, 54. Above these there is a PC termination panel 68 with an aperture 70 in a third row c for the frontplate 46 and a further aperture for the frontplate of the further additional printed circuit board 40.

It should be understood that various changes and modifications will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. An electronic control unit comprising:
   a housing having a rear wall;
   a mother board arranged in the housing and having connection plugs in a row at one edge;
   at least one additional printed circuit board arranged in the housing parallel to the motherboard and having a standard frontplate, the connection plugs of the mother board being accessible through apertures arranged in the rear wall in a first row (a) and the frontplate being accessible through an aperture in the rear wall, parallel to said first row;
   a second row (b) of apertures arranged between and parallel to the first row of apertures and the aperture for the frontplate;
   a daughter board with connection plugs is pluggable onto one of the mother board or the additional printed circuit board, the connection plugs of the daughter board being accessible through apertures of at least one of said rows.

2. The electronic control unit as claimed in claim 1, wherein at least one of the apertures of at least one of the rows is adapted to accommodate a plug.

3. The electronic control unit as claimed in claim 1 wherein the connection plugs of the mother board are accessible through the apertures of the second row (b).

4. The electronic control unit as claimed in claim 1, further comprising a card slot for a PCMCIA card installed between the mother board and the additional printed circuit board, the card slot having a receiving aperture of the card slot being arranged in a wall of the housing at about 90° with respect to the rear wall and being set back into an interior of the housing such that a cable routing space is formed from the receiving aperture to a cable opening in the rear wall.

5. The electronic control unit as claimed in claim 1, wherein the connection plugs of the additional printed circuit board are accessible through the apertures of the second row (b).

6. The electronic control unit as claimed in claim 1, wherein two additional printed circuit boards are provided, each having an associated frontplate disposed in the rear wall.

7. The electronic control unit as claimed in claim 1, wherein the mother board, each additional printed circuit board, and the daughter board are arranged in a stacked manner parallel to each other.

8. An electronic control unit comprising:
   a housing having a rear wall;
   a plurality of circuit boards, including a mother board, at least one additional printed circuit board, and an auxiliary board operably mounted on one of the mother board or the additional printed circuit board, the circuit boards being arranged in the housing in a parallel, stacked manner;
   a row of connection plugs associated with the mother board positioned for access through an associated row of apertures in the rear wall;
   at least one connector region associated with each additional printed circuit board, the region being closable by a frontplate disposed in an aperture in the rear wall;

the connector region providing access to connection plugs associated with the additional printed circuit board; and a row of connection plugs between the row associated with the mother board and said connector region to accommodate connectors associated with at least one of said boards.

9. The electronic control unit as claimed in claim 8, wherein at least one of the connection plugs is of a type for connecting a cable.

10. The electronic control unit as claimed in claim 8, further comprising a card slot for a PCMCIA card installed between the mother board and the additional printed circuit board, the card slot having a receiving aperture arranged in a side wall of the housing disposed at about 90° with respect to the rear wall, the card slot being set back into the housing to form a cable routing space between the receiving aperture and a cable opening in the rear wall.

* * * * *